United States Patent
Nichols et al.

(10) Patent No.: US 9,656,882 B2
(45) Date of Patent: May 23, 2017

(54) WATER TREATMENT COMPOSITION AND METHOD OF USING SAME

(71) Applicant: NC Brands, LP., Norwalk, CT (US)

(72) Inventors: Everett J. Nichols, Edmonds, WA (US); Kylie-Van H. Nguyen, Bellevue, WA (US); James R. Scott, Bellevue, WA (US); Martin Patrick Coles, Mercer Island, WA (US); Jeffrey F. Williams, Langley, WA (US); Eric Robinson, Castle Pines North, CO (US); William R. Lockett, Roswell, GA (US)

(73) Assignee: NC Brands, LP, Norwalk, CT (US)

( * ) Notice: Subject to any disclaimer, the term of this patent is extended or adjusted under 35 U.S.C. 154(b) by 383 days.

(21) Appl. No.: 14/070,272

(22) Filed: Nov. 1, 2013

(65) Prior Publication Data

US 2014/0124454 A1    May 8, 2014

Related U.S. Application Data

(60) Provisional application No. 61/729,950, filed on Nov. 26, 2012, provisional application No. 61/721,182, filed on Nov. 1, 2012.

(51) Int. Cl.
    *B01J 15/00*    (2006.01)
    *B01D 21/01*    (2006.01)
    (Continued)

(52) U.S. Cl.
    CPC ........... *C02F 1/288* (2013.01); *B01J 20/0207* (2013.01); *B01J 20/0211* (2013.01);
    (Continued)

(58) Field of Classification Search
    None
    See application file for complete search history.

(56) References Cited

U.S. PATENT DOCUMENTS 5,683,953 A * 11/1997 Mills ............... C02F 1/5236
                                                210/681
5,897,784 A *  4/1999 Mills ............... C02F 1/5236
                                                210/705
(Continued)

FOREIGN PATENT DOCUMENTS

AU    WO 9419286 A1 *  9/1994 ............ C02F 1/5236
WO       94/19286 A1     9/1994
(Continued)

OTHER PUBLICATIONS

Zirconium Acetate MSDS, pp. 1-2.*
(Continued)

*Primary Examiner* — Clare Perrin
(74) *Attorney, Agent, or Firm* — Allen Dyer Doppelt Milbrath & Gilchrist

(57) ABSTRACT

A water treatment composition includes a water soluble film formed into a sealed pouch. The pouch contains a composite of a phosphate removing substance, a polymer flocculant, or an enzyme, or any combination. The phosphate removing substance, the polymer flocculant, and the enzyme are bound to each other within the composite. The pouch is added to a body of water. The pouch dissolves to release the compounds and treat the water.

22 Claims, 15 Drawing Sheets

(51) Int. Cl.

| | | |
|---|---|---|
| *B03D 3/00* | (2006.01) | |
| *C02F 1/52* | (2006.01) | |
| *B01J 20/22* | (2006.01) | |
| *B01J 20/26* | (2006.01) | |
| *B01J 20/02* | (2006.01) | |
| *C01F 17/00* | (2006.01) | |
| *C01G 25/00* | (2006.01) | |
| *C01G 25/04* | (2006.01) | |
| *C01G 25/06* | (2006.01) | |
| *C01F 7/56* | (2006.01) | |
| *C01F 7/74* | (2006.01) | |
| *C01G 49/02* | (2006.01) | |
| *C01G 49/10* | (2006.01) | |
| *C01G 49/14* | (2006.01) | |
| *C02F 1/28* | (2006.01) | |
| *C02F 1/56* | (2006.01) | |
| *C02F 5/02* | (2006.01) | |
| *C02F 5/08* | (2006.01) | |
| *C02F 5/10* | (2006.01) | |
| *C02F 1/00* | (2006.01) | |
| *B01J 39/00* | (2006.01) | |
| *C02F 1/42* | (2006.01) | |
| *B01J 20/00* | (2006.01) | |
| *C02F 1/68* | (2006.01) | |
| *C02F 3/34* | (2006.01) | |
| *C02F 101/10* | (2006.01) | |
| *C02F 103/42* | (2006.01) | |

(52) U.S. Cl.
CPC ........... *B01J 20/261* (2013.01); *C02F 1/5272* (2013.01); *C02F 1/56* (2013.01); *C02F 1/5236* (2013.01); *C02F 1/687* (2013.01); *C02F 3/342* (2013.01); *C02F 2101/105* (2013.01); *C02F 2103/42* (2013.01); *Y02W 10/45* (2015.05)

(56) References Cited

U.S. PATENT DOCUMENTS

| | | | | |
|---|---|---|---|---|
| 5,910,462 A | * | 6/1999 | Gani | B01J 20/3293 |
| | | | | 264/42 |
| 5,961,845 A | | 10/1999 | List | |
| 6,146,539 A | * | 11/2000 | Mills | C02F 1/5236 |
| | | | | 210/712 |
| 6,149,821 A | * | 11/2000 | Rounds | C02F 1/50 |
| | | | | 206/524.7 |
| 6,180,023 B1 | * | 1/2001 | Amer | C02F 1/5236 |
| | | | | 252/175 |
| 6,312,604 B1 | * | 11/2001 | Denkewicz, Jr. | C02F 1/56 |
| | | | | 210/167.11 |
| 6,383,398 B2 | * | 5/2002 | Amer | C02F 1/5236 |
| | | | | 210/710 |
| 6,428,705 B1 | | 8/2002 | Allen | |
| 6,524,487 B2 | * | 2/2003 | Kulperger | C02F 1/42 |
| | | | | 210/167.11 |
| 6,749,748 B1 | * | 6/2004 | Macpherson | C02F 1/5263 |
| | | | | 210/198.1 |
| 7,320,782 B1 | * | 1/2008 | Jacobsen | B01J 29/06 |
| | | | | 423/305 |
| 2003/0156981 A1 | * | 8/2003 | Mills | A01N 59/00 |
| | | | | 422/37 |
| 2003/0213752 A1 | | 11/2003 | Landis et al. | |
| 2005/0242043 A1 | | 11/2005 | Nichols | |
| 2005/0258103 A1 | * | 11/2005 | Cort | B03C 1/015 |
| | | | | 210/695 |
| 2007/0034575 A1 | * | 2/2007 | Tufano | C02F 1/722 |
| | | | | 210/759 |
| 2009/0223903 A1 | | 9/2009 | Coffey et al. | |
| 2010/0213405 A1 | * | 8/2010 | Wensloff | C02F 1/288 |
| | | | | 252/181 |
| 2011/0000854 A1 | | 1/2011 | Nichols | |
| 2011/0309294 A1 | | 12/2011 | Nichols | |
| 2012/0061330 A1 | | 3/2012 | Washburn | |
| 2012/0145645 A1 | | 6/2012 | Wietholter | |
| 2012/0234703 A1 | | 9/2012 | Nichols | |

FOREIGN PATENT DOCUMENTS

| | | |
|---|---|---|
| WO | 00/24680 A1 | 5/2000 |
| WO | 01/62673 A1 | 8/2001 |

OTHER PUBLICATIONS

International Search Report and Written Opinion mailed Feb. 19, 2014, issued in corresponding International Application No. PCT/US2013/068146, filed Nov. 1, 2013, 8 pages.
First Office Action mailed Apr. 29, 2016, issued in corresponding Chinese Application No. 201380063101.7, filed Nov. 1, 2013, 14 pages.
Extended European Search Report mailed Apr. 18, 2016, issued in corresponding European Application No. 13850828.8, filed Nov. 1, 2013, 8 pages.

* cited by examiner

WATER TREATMENT COMPOSITION AND METHOD OF USING SAME

CROSS-REFERENCES TO RELATED APPLICATIONS

This application claims the benefit of U.S. Provisional Application No. 61/721,182, filed on Nov. 1, 2012, and U.S. Provisional Application No. 61/729,950, filed on Nov. 26, 2012, both disclosures of which are expressly incorporated herein by reference.

BACKGROUND

The removal of impurities from water typically involves the dispensing of chemicals in bulk directly into the water. The use of bulk chemicals is hazardous, because of the possibility of spillage and contact with exposed skin. The dosing of chemicals done manually can be imprecise and messy. In addition, containers of bulk chemicals can be heavy to transport, thereby causing injuries associated with heavy lifting.

SUMMARY

Embodiments of this invention relate to water treatment compositions and methods for treating aqueous bodies of water including recreational water such as swimming pools, hot tubs/spas, and water parks via the use of pre-measured treatment compounds sealed in a water soluble pouch.

Removal of one or more nutrients necessary for the growth of algae such as phosphate can be accomplished by addition of chemicals and substances that form insoluble reaction products that essentially become unavailable to algae for growth. The insoluble reaction products can also be removed from the body of water by filtration. Bodies of water, particularly recreational water, contain suspended organic matter and other chemical entities that result in clouding of the water and the buildup of scum along the walls of the pool or containment device. Removal of this suspended matter by flocculation, enzyme digestion and filtration is disclosed. This may be accomplished by the use of polymer flocculants and digestive enzymes. Phosphate removers, polymer flocculants and enzymes are typically liquid products containing these chemicals. Addition of multiple chemicals is not only time consuming, inconvenient and costly but also would expose the end user to concentrated liquid chemicals that contaminate the outside of bottles from multiple use. It is desired to have packaged, pre-measured, single-dose quantities of chemicals or substances in dry solid forms contained in a water soluble pouch or pod whereby the end user can achieve the multiple goals of nutrient removal, clarification and scum digestion in one convenient single-dose application with minimal direct contact to the concentrated treatment chemicals.

Some embodiments are related to a water treatment composition, including a composite comprised of a phosphate removing substance and a polymer flocculant, wherein the composite comprises free-flowing granular solids and the phosphate removing substance and polymer flocculant are bound to each other within the granular solids.

In some embodiments, the composite has a crystal structure.

In some embodiments, the composite further comprises an enzyme.

In some embodiments, the composite is water soluble.

In some embodiments, the composite is contained in a sealed water soluble pouch.

In some embodiments, the pouch is hydrolyzed polyvinyl alcohol or a cellulose-based material.

In some embodiments, the phosphate removing substance is chosen from a zirconium compound, a rare earth lanthanide salt, an aluminum containing compound, an iron compound, or any combination thereof.

In some embodiments, the phosphate removing substance is chosen from zirconium acetate, zirconium sulfate, zirconium oxychloride, zirconium basic sulfate, and various combinations thereof.

In some embodiments, the phosphate removing substance is lanthanum chloride, lanthanum carbonate, or lanthanum sulfate.

In some embodiments, the phosphate removing substance is chosen from aluminum sulfate, aluminum chloride, polyaluminum chloride, aluminum chlorohydrate, polyaluminum hydroxide sulfate, polyaluminum sulfate chloride, polyaluminum silicate chloride, and various combinations thereof.

In some embodiments, the phosphate removing substance is chosen from iron oxide, iron oxide hydroxide, zerovalent iron, ferric hydroxide, ferric sulfate, ferric chloride, ferric chloride sulfate, polyferric sulfate, ferrous sulfate, and various combinations thereof.

In some embodiments, the phosphate removing substance is chosen from a silica compound such as silica sulfate preferably a mesoporous silica sulfate.

In some embodiments, the polymer flocculant is chosen from a synthetic polymer, a natural biopolymer polysaccharide, a derivatized natural biopolymer saccharide, or any combination thereof.

In some embodiments, the polymer flocculant is chosen from a Polyacrylamide, a Polyacrylamide copolymer such as an acrylamide copolymers of diallydimethylammonium chloride (DADMAC), dimethylaminoethylacrylate (DMAEA), dimethylaminoethylmethacrylate (DMAEM), 3-methylamidepropyltrimethylammonium chloride (MAPTAC) or acrylic acid; a cationic polyacrylamide; an anionic polyacrylamide; a neutral polyacrylamide; a Polyamine; Polyvinylamine; Polyethylene imine; Polydimethyldiallylammonium chloride; Poly oxyethylene; Polyvinyl alcohol; Polyvinyl pyrrolidone; Polyacrylic acid; Polyphosphoric acid; Polystyrene sulfonic acid; and various combinations thereof.

In some embodiments, the polymer flocculant is chosen from chitosan acetate, chitosan lactate, chitosan adipate, chitosan glutamate, chitosan succinate, chitosan malate, chitosan citrate, chitosan fumarate, chitosan hydrochloride, and the like, and various combinations thereof.

In some embodiments, the polymer flocculant is chosen from guar, cationic guar, anionic guar, starch, cationic starch, anionic starch, carrageenan, methylcellulose, hydroxypropylcellulose, sodium carboxymethylcellulose, hydroxymethylcellulose, hydroxypropylmethylcellulose, hydroxyethylcellulose, xanthan, alginates, pectins, glucomannans, galactomannans, and various combinations thereof.

In some embodiments, the enzyme is chosen from an amylase, a cellulase, a protease, a lipase, a phosphatase, a peroxidase, a pectinase, a pepsin, or any combination thereof.

In some embodiments, the phosphate removing substance is zirconium acetate and the polymer flocculant is a chitosan salt, and the composite further comprises a pepsin enzyme, wherein the phosphate removing substance, the polymer flocculant, and the enzyme are bound to each other within the granular solids.

In some embodiments, the phosphate removing substance is lanthanum chloride and the polymer flocculant is a chitosan salt, and the composite further comprises a pepsin enzyme, wherein the phosphate removing substance, the polymer flocculant, and the enzyme are bound to each other within the granular solids.

In some embodiments, the water treatment composition further includes an algicide.

In some embodiments, the water treatment composition further comprises a metal or a metal chelator.

Some embodiments are related to a method of treating an aqueous body of water, comprising adding to the body of water the water treatment composition of claim 1.

In some embodiments, the body of water is chlorinated.

In some embodiments, the method further includes adding the water treatment composition to a skimmer.

In some embodiments, the body of water contains a biguanide sanitizer.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
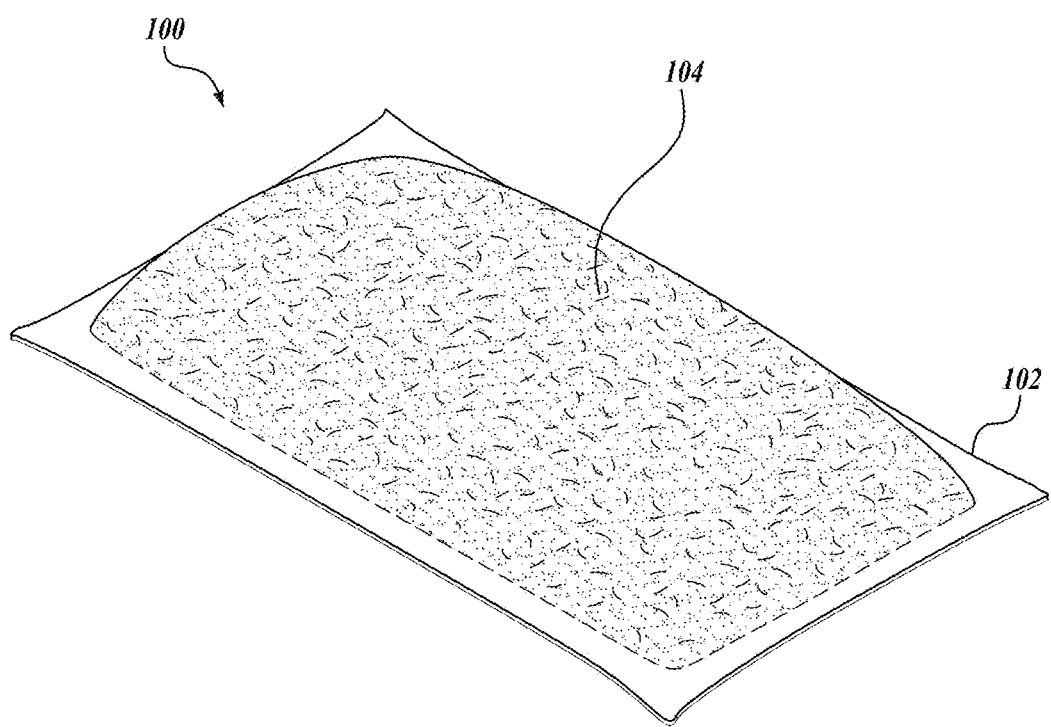
FIG. 1 is a diagrammatical illustration of a water treatment composition including a pouch (or pod) that contains water treatment compounds.

Embodiments of the present invention are related a water treatment composition. Referring to FIG. 1, a diagrammatical illustration of a water treatment composition 100 is illustrated. Embodiments of the water treatment composition 100 include a water soluble film formed into a sealed pouch 102. The pouch 102 can be formed by obtaining a section of water soluble film (described below) folding the film in the middle, adding the compounds, and then sealing the film on three sides. Alternatively, two similar sections of film can be obtained, formed into a pouch, and then sealing all four sides. The pouch 102 can also be made in other shapes, other than the illustrated rectangle. The pouch contents 104 include at least one of the following, a phosphate removing substance, a polymer flocculant, or an enzyme, which are described below. The pouch 102 may include any combination of two or more of the phosphate removing substance, polymer flocculant, or enzyme. The pouch 102, and the phosphate removing substance (or phosphate remover), the polymer flocculant, and enzymes are further described below.

Figure 2:
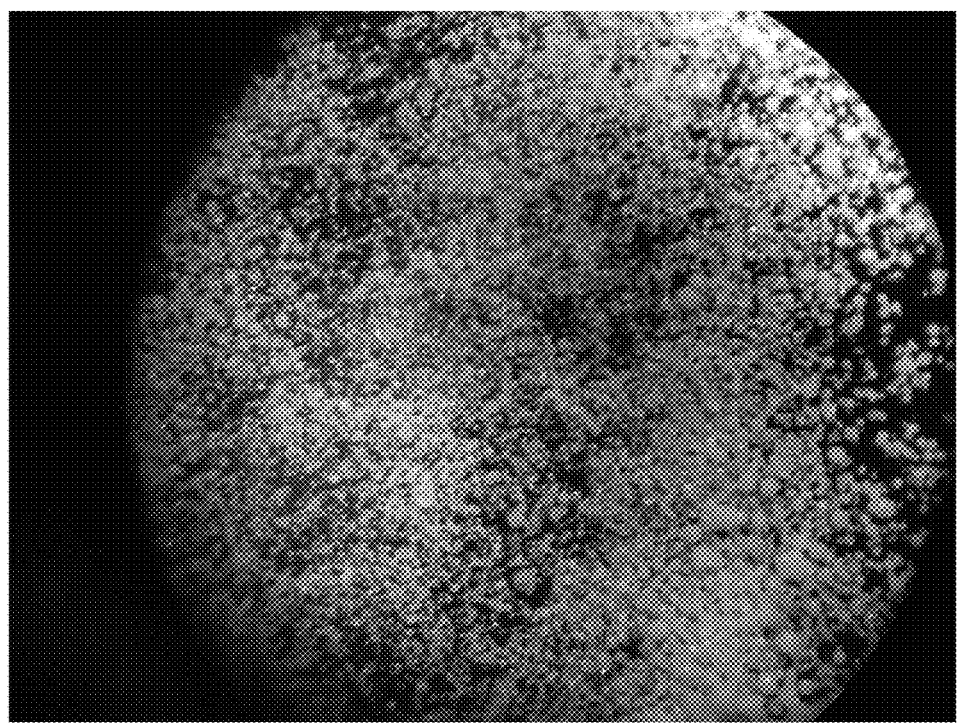
FIG. 2 is a photograph of composite crystals.
Figure 3:
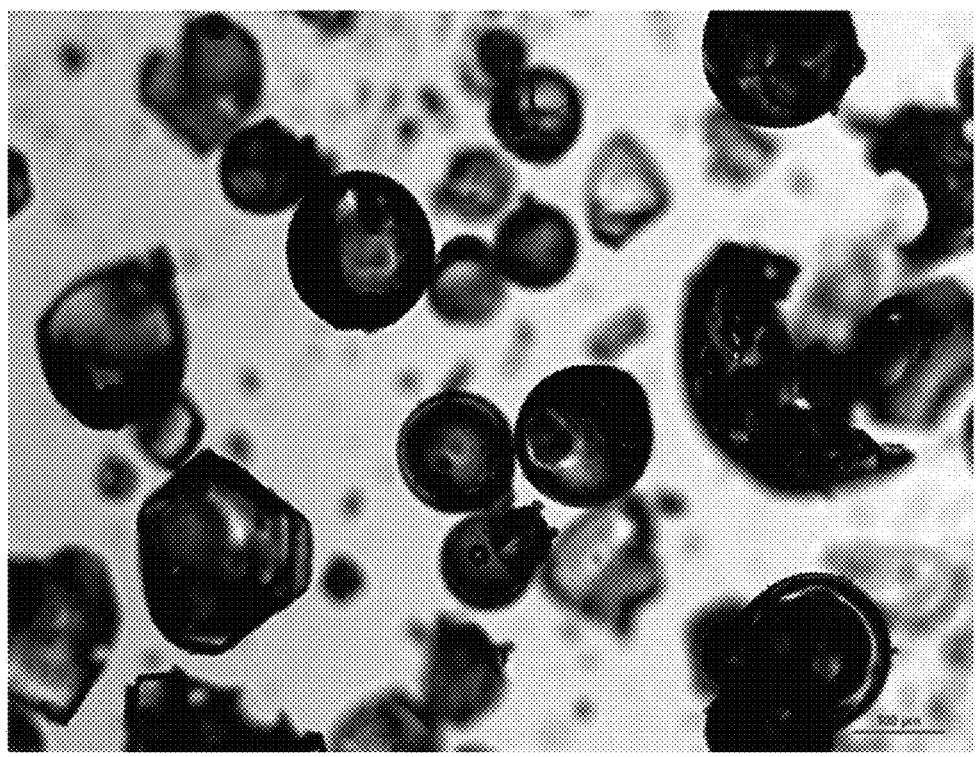
FIG. 3 is a photograph of magnified composite crystals.

Some embodiments of the present invention comprise a water treatment composition comprising a composite formulation comprised of a phosphate remover, a polymer flocculant and an enzyme. FIG. 2 is a photograph of a composite made from a phosphate remover, a polymer flocculant, and an enzyme. FIG. 3 is a magnified photograph of the composite. As seen in the FIGURES, a composite has granular solid crystals, wherein each of the crystal contains the phosphate remover, polymer flocculant, and the enzyme within the crystals. The amounts of the phosphate removing substance, the polymer flocculant, and the enzyme can be adjusted to suit the intended application.

As used herein, "composite" is used to denote a material of two or more components that are bound to each other, as opposed to an admix where each component is physically separate. A composite of components may be bound ionically, covalently, or via other molecular forces. A composite may exist as a crystal structure or as a non-crystalline structure. A composite may include charged or neutral molecules or atoms held together by chemical forces Some embodiments of the present invention also comprise a method of treating water comprising adding to the water a sealed water-soluble pouch/pod containing a pre-measured amount of a composite formulation comprised of a phosphate remover, a polymer flocculant, and an enzyme.

One embodiment of this invention is a water treatment composition comprising a free-flowing granular solid composite comprised of a phosphate removing substance, a polymer flocculant, and an enzyme, wherein the composite is soluble in water.

Another embodiment of this invention is a method of treating an aqueous body of water comprising adding to the aqueous body of water, a water treatment composition comprising a free-flowing granular solid composite comprised of a phosphate removing substance, a polymer flocculant, and an enzyme, wherein the composite is soluble in an aqueous body of water.

Another embodiment of this invention is a water treatment composition comprising a pre-measured amount of a free-flowing granular solid composite comprised of a phosphate removing substance, a polymer flocculant, and an enzyme, wherein the composite is soluble in water and contained in a sealed water-soluble pouch.

Another embodiment of this invention is a method of treating an aqueous body of water comprising adding to the water a sealed water-soluble pouch containing a water treatment composition comprising a pre-measured amount of a free-flowing granular solid composite comprised of a phosphate removing substance, a polymer flocculant, and an enzyme, wherein the composite is soluble in an aqueous body of water.

Another embodiment of this invention is a water treatment composition comprised of a free-flowing granular solid composite comprised of a phosphate removing substance and a polymer flocculant, wherein the composite is soluble in water.

Another embodiment of this invention is a method of treating an aqueous body of water comprising adding to the aqueous body of water, a water treatment composition comprising a free-flowing granular solid composite comprised of a phosphate removing substance and a polymer flocculant, wherein the composite is soluble in an aqueous body of water.

Another embodiment of this invention is a water treatment composition comprising a pre-measured amount of a free-flowing granular solid composite comprised of a phosphate removing substance and a polymer flocculant, wherein the composite is soluble in water and contained in a sealed water-soluble pouch.

Another embodiment of this invention is a method of treating an aqueous body of water comprising adding to the water a sealed water-soluble pouch containing a water treatment composition comprising a pre-measured amount of a free-flowing granular solid composite comprised of a phosphate removing substance and a polymer flocculant, wherein the composite is soluble in an aqueous body of water.

Another embodiment of this invention is a water treatment composition comprising a pre-measured amount of a free-flowing granular solid admix of a phosphate removing substance, a polymer flocculant, and an enzyme contained in a sealed water-soluble pouch.

Another embodiment of this invention is a method of treating an aqueous body of water, comprising adding to the water a sealed water-soluble pouch containing a pre-measured amount of a free-flowing granular solid admix comprised of a phosphate removing substance, a polymer flocculant, and an enzyme.

Another embodiment of this invention is a water treatment composition comprising a pre-measured amount of a free-flowing granular solid admix comprised of a phosphate removing substance and a polymer flocculant contained in a sealed water-soluble pouch.

Another embodiment of this invention is a method of treating an aqueous body of water comprising adding to the water a sealed water-soluble pouch containing a pre-measured amount of a free-flowing granular solid admix comprised of a phosphate removing substance and a polymer flocculant.

Another embodiment of this invention is a water treatment composition comprising a pre-measured amount of a free-flowing granular solid polymer flocculant contained in a sealed water-soluble pouch.

Another embodiment of this invention is a method of treating an aqueous body of water comprising adding to the water a sealed water-soluble pouch containing a pre-measured amount of a free-flowing granular solid polymer flocculant.

Another embodiment of this invention is a water treatment composition comprising a pre-measured amount of a free-flowing granular solid chitosan salt contained in a sealed water-soluble pouch.

Another embodiment of this invention is a method of treating an aqueous body of water comprising adding to the water a sealed water-soluble pouch containing a pre-measured amount of a free-flowing granular solid chitosan salt.

Another embodiment of this invention is a recreational water treatment composition comprising a sealed water-soluble pouch containing a pre-measured amount of a free-flowing granular solid chitosan salt.

Another embodiment of this invention is a method of treating a recreational body of water including a swimming pool, a hot tub, a spa, a large water park body of water, comprising adding to the water, by placing in the skimmer, a sealed water-soluble pouch containing a free-flowing granular solid chitosan salt, wherein the free-flowing granular solid chitosan salt is soluble in the recreational body of water.

Another embodiment of this invention is a water treatment composition comprising a pre-measured amount of a free-flowing granular solid phosphate removing substance contained in a sealed water-soluble pouch.

Another embodiment of this invention is a water treatment composition comprising a pre-measured amount of a free-flowing granular solid phosphate removing substance contained in a sealed water-soluble pouch, wherein the free-flowing granular solid phosphate removing substance is water soluble.

Another embodiment of this invention is a method of treating an aqueous body of water comprising adding to the water a sealed water-soluble pouch containing a phosphate removing substance, wherein the free-flowing granular solid phosphate removing substance is water soluble.

Another embodiment of this invention is a water treatment composition comprising a pre-measured amount of a free-flowing granular solid phosphate removing substance contained in a sealed water-soluble pouch, wherein the free-flowing granular solid phosphate removing substance is partially water soluble.

Another embodiment of this invention is a method of treating an aqueous body of water comprising adding to the water a sealed water-soluble pouch containing a phosphate removing substance, wherein the free-flowing granular solid phosphate removing substance is partially water soluble.

Another embodiment of this invention is a water treatment composition comprising a pre-measured amount of a free-flowing granular solid phosphate removing substance and a polymer flocculant contained in a sealed water-soluble pouch, wherein the free-flowing granular solid phosphate removing substance is partially water soluble.

Another embodiment of this invention is a method of treating an aqueous body of water comprising adding to the water a sealed water-soluble pouch containing a phosphate removing substance and a polymer flocculant, wherein the free-flowing granular solid phosphate removing substance is partially water soluble.

Another embodiment of this invention is a water treatment composition comprising a pre-measured amount of a free-flowing granular solid phosphate removing substance contained in a sealed water-soluble pouch, wherein the free-flowing granular solid phosphate removing substance is substantially water insoluble.

Another embodiment of this invention is a method of treating an aqueous body of water comprising adding to the water a sealed water-soluble pouch containing a phosphate removing substance, wherein the free-flowing granular solid phosphate removing substance is substantially water insoluble.

Another embodiment of this invention is a water treatment composition comprising a pre-measured amount of a free-flowing granular solid phosphate removing substance and a polymer flocculant contained in a sealed water-soluble pouch, wherein the free-flowing granular solid phosphate removing substance is substantially water insoluble.

Another embodiment of this invention is a method of treating an aqueous body of water comprising adding to the water a sealed water-soluble pouch containing a phosphate removing substance and a polymer flocculant, wherein the free-flowing granular solid phosphate removing substance is substantially water insoluble.

Another embodiment of this invention is a water treatment composition comprising a free-flowing granular solid composite comprised of zirconium acetate, a chitosan salt, and an enzyme wherein the composite is soluble in water.

Another embodiment of this invention is a method of treating an aqueous body of water comprising adding to the aqueous body of water, a water treatment composition comprising a free-flowing granular solid composite comprised of zirconium acetate, a chitosan salt, and an enzyme, wherein the composite is soluble in an aqueous body of water.

Another embodiment of this invention is a water treatment composition comprising a pre-measured amount of a free-flowing granular solid composite comprised of zirconium acetate, a chitosan salt, and an enzyme, wherein the composite is soluble in water and contained in a sealed water-soluble pouch.

Another embodiment of this invention is a method of treating an aqueous body of water comprising adding to the water a sealed water-soluble pouch containing a pre-measured amount of a free-flowing granular solid composite comprised of zirconium acetate, a chitosan salt, and an enzyme, wherein the free-flowing granular solid composite is soluble in an aqueous body of water.

Another embodiment of this invention is a method of treating a recreational body of water including a swimming pool, a hot tub, a spa, a large water park body of water, comprising adding to the water a sealed water-soluble pouch containing a pre-measured amount of a free-flowing granular solid composite comprised of zirconium acetate, a chitosan salt, and an enzyme, wherein the free-flowing granular solid composite is soluble in the recreational body of water.

Another embodiment of this invention is a water treatment composition comprising a free-flowing granular solid composite comprised of zirconium acetate, a chitosan salt, and the enzyme pepsin, wherein the composite is soluble in water.

Another embodiment of this invention is a method of treating an aqueous body of water comprising adding to the aqueous body of water, a water treatment composition comprising a free-flowing granular solid composite comprised of zirconium acetate, a chitosan salt, and the enzyme pepsin, wherein the composite is soluble in an aqueous body of water.

Another embodiment of this invention is a water treatment composition comprising a pre-measured amount of a free-flowing granular solid composite comprised of zirconium acetate, a chitosan salt, and the enzyme pepsin, wherein the composite is soluble in water and contained in a sealed water-soluble pouch.

Another embodiment of this invention is a method of treating an aqueous body of water comprising adding to the water a sealed water-soluble pouch containing a pre-measured amount of a free-flowing granular solid composite comprised of zirconium acetate, a chitosan salt, and the enzyme pepsin, wherein the free-flowing granular solid composite is soluble in an aqueous body of water.

Another embodiment of this invention is a method of treating a recreational body of water including a swimming pool, a hot tub, a spa, a large water park body of water comprising adding to the water a sealed water-soluble pouch containing a pre-measured amount of a free-flowing granular solid composite comprised of zirconium acetate, a chitosan salt, and the enzyme pepsin, wherein the free-flowing granular solid composite is soluble in an aqueous body of water.

Another embodiment of this invention is a method of treating a recreational body of water including a swimming pool, a hot tub, a spa, a large water park body of water comprising adding to the water by, placing in the skimmer, a sealed water-soluble pouch containing a pre-measured amount of a free-flowing granular solid composite comprised of zirconium acetate, a chitosan salt, and the enzyme pepsin, wherein the free-flowing granular solid composite is soluble in an aqueous body of water.

Another embodiment of this invention is a method of treating a recreational body of water including a swimming pool, a hot tub, a spa, a large water park body of water, comprising adding to the water by, placing in the skimmer, a sealed water-soluble pouch containing a pre-measured amount of a free-flowing granular solid composite comprised of zirconium acetate, a chitosan salt, and an enzyme, wherein the free-flowing granular solid composite is soluble in the recreational body of water.

Another embodiment of this invention is a method of treating a recreational body of water including a swimming pool, a hot tub, a spa, a large water park body of water, comprising adding to the water, by placing in the skimmer, a sealed water-soluble pouch containing a phosphate removing substance and a polymer flocculant, wherein the free-flowing granular solid phosphate removing substance is substantially water insoluble.

Another embodiment of this invention is a method of treating a recreational body of water including a swimming pool, a hot tub, a spa, a large water park body of water, comprising adding to the water, by placing in the skimmer, a sealed water-soluble pouch containing a phosphate removing substance, wherein the free-flowing granular solid phosphate removing substance is substantially water insoluble.

Another embodiment of this invention is a method of treating a recreational body of water including a swimming pool, a hot tub, a spa, a large water park body of water, comprising adding to the water, by placing in the skimmer, a water treatment composition comprising a free-flowing granular solid composite comprised of zirconium acetate, a chitosan salt, and an enzyme, wherein the composite is soluble in an aqueous body of water.

Another embodiment of this invention is a method of treating a recreational body of water including a swimming pool, a hot tub, a spa, a large water park body of water, comprising adding to the water, by placing in the skimmer, a sealed water-soluble pouch containing a pre-measured amount of a free-flowing granular solid composite comprised of zirconium acetate, a chitosan salt, and an enzyme, wherein the free-flowing granular solid composite is soluble in the recreational body of water.

Another embodiment of this invention is a method of treating a, recreational body of water including a swimming pool, a hot tub, a spa, a large water park body of water, comprising adding to the water, by placing in the skimmer, a sealed water-soluble pouch containing a pre-measured amount of a free-flowing granular solid admix of a phosphate removing substance, a polymer flocculant, and an enzyme.

Another embodiment of this invention is a method of treating a, recreational body of water including a swimming pool, a hot tub, a spa, a large water park body of water, comprising adding to the water, by placing in the skimmer, a sealed water-soluble pouch containing a pre-measured amount of a free-flowing granular solid phosphate removing substance.

Another embodiment of this invention is a method of treating a, recreational body of water including a swimming pool, a hot tub, a spa, a large water park body of water, comprising adding to the water, by placing in the skimmer, a sealed water-soluble pouch containing a pre-measured amount of a free-flowing granular solid pool composite and/or admix comprised of a variety of recreational water treatment chemicals or substances in various combinations, including, but not limited to, the following: coagulants, clarifiers, polymer flocculants, algicides including, but not limited to, quats such as alkyldimethylbenzyl ammonium chloride, dimethyldidecylammonium chloride, poly quats such as poly[oxyethylene(dimethyliminio)-ethylene-(dimethyliminio)-ethylene-dichloride], copper salts such as copper sulfate pentahydrate, sodium or potassium tetraborate, hydrogen or calcium peroxides, fungicides, bactericides (including quaternary ammonium salts, Polyhexamethylene Biguanide (PHMB) with hydrogen or calcium peroxide, halogen sanitizers, sodium bromide, potassium bromide), chlorine stabilizers (including water soluble cyanuric acid salts, cyanuric acid), pH adjusting chemicals (such as sodium bicarbonate, sodium carbonate, sodium bisulfate), hydrated calcium chloride, anhydrous calcium chloride, cyanuric acid-reactive chemicals including melamine, metal chelating or metal sequestering agents including but not limited to ethylenediaminetetracetic acid and salts thereof, hydroxyethylene diphosphonic acid and salts thereof, phosphonobutanetricarboxylic acid and salts thereof, oxalic acid and salts thereof, citric acid and salts thereof, phosphate adsorbing, phosphate binding, phosphate reacting or phosphate removing chemicals, enzymes, fragrances, filter aids including cellulosic fibers, calcium hardness reducing chemicals or substances, cyanuric acid reducing chemicals or substances, defoamers including silicon based defoamers.

Another embodiment of this invention is a recreational water treatment composition comprising a sealed water-soluble pouch containing a pre-measured amount of a liquid formulation comprised of a variety of recreational water treatment chemicals or substances in various combinations, used for heat retention or evaporation prevention, including, but not limited to, the following: Brig 59 (polyethylene 20 cetyl ether), Span 40 (sorbitan monopalmitate), cetyl alcohol, methyl paraben, propyl paraben, propylene glycol.

Another embodiment of this invention is a method of treating a recreational body of water including a swimming pool, a hot tub, a spa, a large water park body of water comprising adding to the water a sealed water-soluble pouch containing a pre-measured amount of a liquid formulation comprised of a variety of recreational water treatment chemicals or substances in various combinations, used for heat retention or evaporation prevention, including, but not limited to, the following: Brig 59 (polyethylene 20 cetyl ether), Span 40 (sorbitan monopalmitate), cetyl alcohol, methyl paraben, propyl paraben, propylene glycol.

Another embodiment of this invention is a method of treating a recreational body of water including a swimming pool, a hot tub, a spa, a large water park body of water, comprising adding to the water, by placing in the skimmer, a sealed water-soluble pouch containing a pre-measured amount of a liquid formulation comprised of a variety of recreational water treatment chemicals or substances in various combinations, used for heat retention or evaporation prevention, including, but not limited to, the following: Brig 59 (polyethylene 20 cetyl ether), Span 40 (sorbitan monopalmitate), cetyl alcohol, methyl paraben, propyl paraben, propylene glycol.

Another embodiment of this invention is a, recreational water treatment composition comprising a sealed water-soluble pouch containing a pre-measured amount of a free-flowing granular solid composite and/or admix comprised of a variety of recreational water treatment chemicals or substances in various combinations, including, but not limited to, the following: coagulants, clarifiers, polymer flocculants, algicides including but not limited to, quats such as alkyldimethylbenzyl ammonium chloride, dimethyldidecylammonium chloride, poly quats such as poly[oxyethylene (dimethyliminio)-ethylene-(dimethyliminio)-ethylene-dichloride], copper salts such as copper sulfate pentahydrate, sodium or potassium tetraborate, hydrogen or calcium peroxides, fungicides, bactericides (including quaternary ammonium salts, Polyhexamethylene Biguanide (PHMB) with hydrogen or calcium peroxide, halogen sanitizers, sodium bromide, potassium bromide), chlorine stabilizers (including water soluble cyanuric acid salts, cyanuric acid), pH adjusting chemicals (such as sodium bicarbonate, sodium carbonate, sodium bisulfate), hydrated calcium chloride, anhydrous calcium chloride, cyanuric acid-reactive chemicals including melamine, metal chelating or metal sequestering agents including but not limited to ethylenediaminetetracetic acid and salts thereof, hydroxyethylene diphosphonic acid and salts thereof, phosphonobutanetricarboxylic acid and salts thereof, oxalic acid and salts thereof, citric acid and salts thereof, phosphate adsorbing, phosphate binding, phosphate reacting or phosphate removing chemicals, enzymes, fragrances, filter aids including cellulosic fibers, calcium hardness reducing chemicals or substances, cyanuric acid reducing chemicals or substances, defoamers including silicon based defoamers.

Another embodiment of this invention is a recreational water treatment composition comprising a sealed water-soluble pouch containing a pre-measured amount of a free-flowing granular solid, recreational water treatment chemical or substance selected from, as a single chemical entity or in various combinations of multiple chemical entities, but not limited to the following: coagulants, clarifiers, polymer flocculants, algicides including but not limited to, quats such as alkyldimethylbenzyl ammonium chloride, dimethyldidecylammonium chloride, poly quats such as poly[oxyethylene(dimethyliminio)-ethylene-(dimethyliminio)-ethylene-dichloride], copper salts such as copper sulfate pentahydrate, sodium or potassium tetraborate, hydrogen or calcium peroxides, fungicides, bactericides (including quaternary ammonium salts, Polyhexamethylene Biguanide (PHMB) with hydrogen or calcium peroxide, halogen sanitizers, sodium bromide, potassium bromide), chlorine stabilizers (including water soluble cyanuric acid salts, cyanuric acid), pH adjusting chemicals (such as sodium bicarbonate, sodium carbonate, sodium bisulfate), hydrated calcium chloride, anhydrous calcium chloride, cyanuric acid-reactive chemicals including melamine, metal chelating or metal sequestering agents including but not limited to ethylenediaminetetracetic acid and salts thereof, hydroxyethylene diphosphonic acid and salts thereof, phosphonobutanetricarboxylic acid and salts thereof, oxalic acid and salts thereof, citric acid and salts thereof, phosphate adsorbing, phosphate binding, phosphate reacting or phosphate removing chemicals, enzymes, fragrances, filter aids including cellulosic fibers, calcium hardness reducing chemicals or substances, cyanuric acid reducing chemicals or substances, defoamers including silicon based defoamers.

Another embodiment of this invention is a recreational water treatment composition comprising a sealed water-soluble pouch containing a pre-measured amount of a chlorine stabilizing agent, a phosphate remover agent, a metal chelating agent, a pH balancing agent.

Another embodiment of this invention is a water treatment composition comprising a free-flowing granular solid composite comprised of lanthanum chloride, a chitosan salt and an enzyme, wherein the composite is soluble in water.

Another embodiment of this invention is a method of treating an aqueous body of water comprising adding to the aqueous body of water, a water treatment composition comprising a free-flowing granular solid composite comprised of lanthanum chloride, a chitosan salt, and an enzyme, wherein the composite is soluble in an aqueous body of water.

Another embodiment of this invention is a water treatment composition comprising a pre-measured amount of a free-flowing granular solid composite comprised of lanthanum chloride, a chitosan salt, and an enzyme, wherein the composite is soluble in water and contained in a sealed water-soluble pouch.

Another embodiment of this invention is a method of treating an aqueous body of water comprising adding to the water a sealed water-soluble pouch containing a pre-measured amount of a free-flowing granular solid composite comprised of lanthanum chloride, a chitosan salt, and an enzyme, wherein the free-flowing granular solid composite is soluble in an aqueous body of water.

Another embodiment of this invention is a method of treating a recreational body of water including a swimming pool, a hot tub, a spa, a large water park body of water, comprising adding to the water a sealed water-soluble pouch containing a pre-measured amount of a free-flowing granular solid composite comprised of lanthanum chloride, a chitosan salt, and an enzyme, wherein the free-flowing granular solid composite is soluble in the recreational body of water.

Another embodiment of this invention is a water treatment composition comprising a free-flowing granular solid composite comprised of lanthanum chloride, a chitosan salt, and the enzyme pepsin, wherein the composite is soluble in water.

Another embodiment of this invention is a method of treating an aqueous body of water comprising adding to the aqueous body of water, a water treatment composition comprising a free-flowing granular solid composite comprised of lanthanum chloride, a chitosan salt, and the enzyme pepsin, wherein the composite is soluble in an aqueous body of water.

Another embodiment of this invention is a water treatment composition comprising a pre-measured amount of a free-flowing granular solid composite comprised of lanthanum chloride, a chitosan salt, and the enzyme pepsin, wherein the composite is soluble in water and contained in a sealed water-soluble pouch.

Another embodiment of this invention is a method of treating an aqueous body of water comprising adding to the water a sealed water-soluble pouch containing a pre-measured amount of a free-flowing granular solid composite comprised of lanthanum chloride, a chitosan salt and the enzyme pepsin, wherein the free-flowing granular solid composite is soluble in an aqueous body of water.

Another embodiment of this invention is a method of treating a recreational body of water including a swimming pool, a hot tub, a spa, a large water park body of water comprising adding to the water a sealed water-soluble pouch containing a pre-measured amount of a free-flowing granular solid composite comprised of lanthanum chloride, a chitosan salt, and the enzyme pepsin, wherein the free-flowing granular solid composite is soluble in an aqueous body of water.

Another embodiment of this invention is a method of treating a recreational body of water including a swimming pool, a hot tub, a spa, a large water park body of water comprising adding to the water, by placing in the skimmer, a sealed water-soluble pouch containing a pre-measured amount of a free-flowing granular solid composite comprised of lanthanum chloride, a chitosan salt and the enzyme pepsin, wherein the free-flowing granular solid composite is soluble in an aqueous body of water.

Another embodiment of this invention is a method of treating a recreational body of water including a swimming pool, a hot tub, a spa, a large water park body of water, comprising adding to the water, by placing in the skimmer, a sealed water-soluble pouch containing a pre-measured amount of a free-flowing granular solid composite comprised of lanthanum chloride, a chitosan salt and an enzyme, wherein the free-flowing granular solid composite is soluble in the recreational body of water.

Another embodiment of this invention is a recreational water treatment composition comprising a sealed water-soluble pouch containing a pre-measured amount of a free-flowing solid enzyme powder or granules.

Another embodiment of this invention is a method of treating a recreational body of water including a swimming pool, a hot tub, a spa, a large water park body of water, comprising adding to the water, by placing in the skimmer, a sealed water-soluble pouch containing a pre-measured amount of a free-flowing solid enzyme powder or granules, wherein the free-flowing solid enzyme powder or granules is soluble in the recreational body of water.

Another embodiment of this invention is a, recreational water treatment composition comprising a sealed water-soluble pouch containing a pre-measured amount of a free-flowing solid enzyme powder or granules and a polymer flocculant.

Another embodiment of this invention is a method of treating a recreational body of water including a swimming pool, a hot tub, a spa, a large water park body of water, comprising adding to the water, by placing in the skimmer, a sealed water-soluble pouch containing a pre-measured amount of a free-flowing solid enzyme powder or granules and a polymer flocculant wherein the free-flowing solid enzyme powder or granules and polymer flocculant are soluble in the recreational body of water.

Another embodiment of this invention is a recreational water treatment composition comprising a sealed water-soluble pouch containing a pre-measured amount of a free-flowing solid enzyme powder or granules and a chitosan salt.

Another embodiment of this invention is a method of treating a recreational body of water including a swimming pool, a hot tub, a spa, a large water park body of water, comprising adding to the water, by placing in the skimmer, a sealed water-soluble pouch containing a pre-measured amount of a free-flowing solid enzyme powder or granules and a chitosan salt, wherein the free-flowing solid enzyme powder or granules and chitosan salt are soluble in the recreational body of water.

Another embodiment of this invention is a, recreational water treatment composition comprising a sealed water-soluble pouch containing a pre-measured amount of a free-flowing solid copper sulfate pentahydrate algicide.

Another embodiment of this invention is a method of treating a recreational body of water including a swimming pool, a hot tub, a spa, a large water park body of water, comprising adding to the water, by placing in the skimmer, a sealed water-soluble pouch containing a pre-measured amount of a free-flowing solid copper sulfate pentahydrate algicide that is soluble in the recreational body of water.

Another embodiment of this invention is a natural or industrial water treatment composition comprising a sealed water-soluble pouch containing a pre-measured amount of a free-flowing solid copper sulfate pentahydrate algicide that is soluble in the natural or industrial body of water.

Another embodiment of this invention is a method of treating a natural or industrial body of water, comprising adding to the water a sealed water-soluble pouch containing a pre-measured amount of a free-flowing solid copper sulfate pentahydrate algicide that is soluble in the natural or industrial body of water.

Some embodiments are related to a water treatment composition, including a composite comprised of a phosphate removing substance and a polymer flocculant, wherein the composite comprises free-flowing granular solids and the phosphate removing substance and polymer flocculant are bound to each other within the granular solids.

In some embodiments, the composite has a crystal structure.

In some embodiments, the composite further comprises an enzyme.

In some embodiments, the composite is water soluble.

In some embodiments, the composite is contained in a sealed water soluble pouch.

In some embodiments, the pouch is hydrolyzed polyvinyl alcohol or a cellulose-based material.

In some embodiments, the phosphate removing substance is chosen from a zirconium compound, a rare earth lanthanide salt, an aluminum containing compound, an iron compound, or any combination thereof.

In some embodiments, the phosphate removing substance is chosen from zirconium acetate, zirconium sulfate, zirconium oxychloride, zirconium basic sulfate, and various combinations thereof.

In some embodiments, the phosphate removing substance is lanthanum chloride, lanthanum carbonate, or lanthanum sulfate.

In some embodiments, the phosphate removing substance is chosen from aluminum sulfate, aluminum chloride, polyaluminum chloride, aluminum chlorohydrate, polyaluminum hydroxide sulfate, polyaluminum sulfate chloride, polyaluminum silicate chloride, and various combinations thereof.

In some embodiments, the phosphate removing substance is chosen from iron oxide, iron oxide hydroxide, zerovalent iron, ferric hydroxide, ferric sulfate, ferric chloride, ferric chloride sulfate, polyferric sulfate, ferrous sulfate, and various combinations thereof.

In some embodiments, the phosphate removing substance is chosen from a silica compound such as silica sulfate preferably a mesoporous silica sulfate.

In some embodiments, the polymer flocculant is chosen from a synthetic polymer, a natural biopolymer polysaccharide, a derivatized natural biopolymer saccharide, or any combination thereof.

In some embodiments, the polymer flocculant is chosen from a Polyacrylamide, a Polyacrylamide copolymer such as an acrylamide copolymers of diallydimethylammonium chloride (DADMAC), dimethylaminoethylacrylate (DMAEA), dimethylaminoethylmethacrylate (DMAEM), 3-methylamidepropyltrimethylammonium chloride (MAPTAC) or acrylic acid; a cationic polyacrylamide; an anionic polyacrylamide; a neutral polyacrylamide; a Polyamine; Polyvinylamine; Polyethylene imine; Polydimethyldiallylammonium chloride; Poly oxyethylene; Polyvinyl alcohol; Polyvinyl pyrrolidone; Polyacrylic acid; Polyphosphoric acid; Polystyrene sulfonic acid; and various combinations thereof.

In some embodiments, the polymer flocculant is chosen from chitosan acetate, chitosan lactate, chitosan adipate, chitosan glutamate, chitosan succinate, chitosan malate, chitosan citrate, chitosan fumarate, chitosan hydrochloride, and the like, and various combinations thereof.

In some embodiments, the polymer flocculant is chosen from guar, cationic guar, anionic guar, starch, cationic starch, anionic starch, carrageenan, methylcellulose, hydroxypropylcellulose, sodium carboxymethylcellulose, hydroxymethylcellulose, hydroxypropylmethylcellulose, hydroxyethylcellulose, xanthan, alginates, pectins, glucomannans, galactomannans, and various combinations thereof.

In some embodiments, the enzyme is chosen from an amylase, a cellulase, a protease, a lipase, a phosphatase, a peroxidase, a pectinase, a pepsin, or any combination thereof.

In some embodiments, the phosphate removing substance is zirconium acetate and the polymer flocculant is a chitosan salt, and the composite further comprises a pepsin enzyme, wherein the phosphate removing substance, the polymer flocculant, and the enzyme are bound to each other within the granular solids.

In some embodiments, the phosphate removing substance is lanthanum chloride and the polymer flocculant is a chitosan salt, and the composite further comprises a pepsin enzyme, wherein the phosphate removing substance, the polymer flocculant, and the enzyme are bound to each other within the granular solids.

In some embodiments, the water treatment composition further includes an algicide.

In some embodiments, the water treatment composition further comprises a metal sequestrant or a metal chelator.

Some embodiments are related to a method of treating an aqueous body of water, comprising adding to the body of water the water treatment composition of claim 1.

In some embodiments, the body of water is chlorinated.

In some embodiments, the method further includes adding the water treatment composition to a skimmer.

In some embodiments, the body of water contains a biguanide sanitizer.

The phosphate removing substance of the various embodiments can be selected from a zirconium compound such as zirconium acetate, zirconium sulfate, zirconium oxychloride, zirconium basic sulfate, and various combinations thereof.

The phosphate removing substance of the various embodiments can be selected from a rare earth lanthanide salt such as lanthanum chloride, lanthanum carbonate or lanthanum sulfate including combinations thereof.

The phosphate removing substance of the various embodiments can be selected from an aluminum compound such as aluminum sulfate, aluminum chloride, polyaluminum chloride, aluminum chlorohydrate, polyaluminum hydroxide sulfate, polyaluminum sulfate chloride, polyaluminum silicate chloride, and various combinations thereof.

The phosphate removing substance of the various embodiments can be selected from an iron compound such as iron oxide, iron oxide hydroxide, zerovalent iron, ferric hydroxide, ferric sulfate, ferric chloride, ferric chloride sulfate, polyferric sulfate, ferrous sulfate, and various combinations thereof.

The phosphate removing substance of the various embodiments can be selected from a silica-containing compound such as silica sulfate, particularly as mesoporous silica sulfate.

The phosphate removing substance of the various embodiments can be comprised of various combinations of one or more of an iron compound, a rare earth compound, an aluminum compound, and a zirconium compound.

The polymer flocculant of the various embodiments can be selected from a synthetic polymer such as a: Polyacrylamide, a Polyacrylamide copolymer such as an acrylamide copolymers of diallydimethylammonium chloride (DADMAC), dimethylaminoethylacrylate (DMAEA), dimethylaminoethylmethacrylate (DMAEM), 3-methylamidepropyltrimethylammonium chloride (MAPTAC) or acrylic acid; a cationic polyacrylamide; an anionic polyacrylamide; a neutral polyacrylamide; a Polyamine; Polyvinylamine; Polyethylene imine; Polydimethyldiallylammonium chloride; Poly oxyethylene; Polyvinyl alcohol; Polyvinyl pyrrolidone; Polyacrylic acid; Polyphosphoric acid; Polystyrene sulfonic acid; and various combinations thereof.

The polymer flocculant of the various embodiments can be selected from a natural biopolymer polysaccharide including but not limited to a chitosan salt including chitosan acetate, chitosan lactate, chitosan adipate, chitosan glutamate, chitosan succinate, chitosan malate, chitosan citrate, chitosan fumarate, chitosan hydrochloride, and the like, and various combinations thereof. Chitosan salts useful as polymer flocculants in the practice of the various embodiments typically have a molecular weight in the range of from 20,000 Daltons to two million Daltons, such as from 50,000 Daltons to one million Daltons, or such as from 100,000 Daltons to 900,000 Daltons. Chitosan salts typically have a percentage deacetylation of from 50% to 100%, such as from 60% to 95%, or from 70%. to 90%. Some chitosan salts useful in the practice of the invention are a salt of chitosan with a C1 to C18 mono- or polycarboxylic acid, such as chitosan acetate or chitosan lactate. By way of non-limiting example, chitosan salts useful in the practice of the invention include: chitosan glutamate, chitosan hydrochloride, chitosan succinate, chitosan fumarate, chitosan adipate, chitosan glycolate, chitosan tartrate, chitosan formate, chitosan malate, and chitosan citrate. Other useful flocculants include anionic or cationic forms of any of the following compounds: N-halochitosans, gums, starches, and polyacrylamides. Exemplary N-halochitosans are polymers that include 1% to 35% 2-deoxy-2-acetamidoglucose monomeric units, 1% to 90% 2-deoxy-2-aminoglucose monomeric units and 8% to 98% 2-deoxy-2-haloaminoglucose monomeric units, wherein the haloamino group is chloroamino or bromoamino or iodoamino.

The polymer flocculant of the various embodiments can be selected from a natural biopolymer polysaccharide or a derivatized natural biopolymer polysaccharide including but not limited to guar, cationic guar, anionic guar, starch, cationic starch, anionic starch, carrageenan, methylcellulose, hydroxypropylcellulose, sodium carboxymethylcellulose, hydroxymethylcellulose, hydroxypropylmethylcellulose, hydroxyethylcellulose, xanthan, alginates, pectins, glucomannans, galactomannans and the like and various combinations thereof.

The enzyme of the various embodiments can be selected from the following enzymes, but not limited to, an amylase, a cellulase, a protease, a lipase, a phosphatase, a peroxidase, a pectinase a pepsin, and the like, and may include various combinations thereof. An enzyme may be added to degrade organic material, for example.

A metal or metal chelator can be used in the embodiments described herein. Suitable metal s and chelators include, but are not limited to one or more of the following, ethylenediamine tetraacetic acid (EDTA), the sodium salt of ethylenediamine tetraacetic acid, diethylenetriamine pentaacetic acid, citric acid, sodium gluconate, potassium gluconate, sodium tripolyphosphate, glucono delta-lactone, calcium disodium ethylene diamine tetra-acetate, and sodium hexametaphosphate, or any combination.

The water soluble films used to prepare the pod or pouch of the various embodiments can be comprised of partially hydrolyzed polyvinyl alcohol. Alternatively, the water soluble film can be a polyvinyl alcohol. Controlling the degree of hydrolysis can determine the rate of solubility. The films should be compatible with the chemicals they contain. Water soluble cellulose-based materials can also be used to prepare the pod or pouch. Other film materials may include quaternized protein hydrolyzates, quaternized polyamines, polyvinylpyrrolidone, acrylic acid-maleic acid copolymers, polyphosphates, and dextrin derivatives. The process of making the water soluble films and water soluble pouches is routine in the art. In some cases, the thickness of the film can be increased or decreased depending on whether the solubility of the film needs to increase or decrease. Generally however, a fast dissolution time is preferred. In addition, some embodiments may use colored or dyed films. Furthermore, the materials for the water soluble films are not limited to the above and any known water soluble film meeting the criteria above may be used.

Any compound or component of a composite, admix, or composition of the various embodiments may comprise about, at most about, or at least about a weight percent of 0.1, 0.5, 1, 1.5, 2, 2.5, 3, 3.5, 4, 4.5, 5, 5.5, 6, 6.5, 7, 7.5, 8, 8.5, 9, 9.5, 10, 10.5, 11, 11.5, 12, 12.5, 13, 13.5, 14, 14.5, 15, 15.5, 16, 16.5, 17, 17.5, 18, 18.5, 19, 19.5, 20, 20.5, 21, 21.5, 22, 22.5, 23, 23.5, 24, 24.5, 25, 25.5, 26, 26.5, 27, 27.5, 28, 28.5, 29, 29.5, 30, 30.5, 31, 31.5, 32, 32.5, 33, 33.5, 34, 34.5, 35, 35.5, 36, 36.5, 37, 37.5, 38, 38.5, 39, 39.5, 40, 40.5, 41, 41.5, 42, 42.5, 43, 43.5, 44, 44.5, 45, 45.5, 46, 46.5, 47, 47.5, 48, 48.5, 49, 49.5, 50, 50.5, 51, 51.5, 52, 52.5, 53, 53.5, 54, 54.5, 55, 55.5, 56, 56.5, 57, 57.5, 58, 58.5, 59, 59.5, 60, 60.5, 61, 61.5, 62, 62.5, 63, 63.5, 64, 64.5, 65, 65.5, 66, 66.5, 67, 67.5, 68, 68.5, 69, 69.5, 70, 70.5, 71, 71.5, 72, 72.5, 73, 73.5, 74, 74.5, 75, 75.5, 76, 76.5, 77, 77.5, 78, 78.5, 79, 79.5, 80, 80.5, 81, 81.5, 82, 82.5, 83, 83.5, 84, 84.5, 85, 85.5, 86, 86.5, 87, 87.5, 88, 88.5, 89, 89.5, 90, 90.5, 91, 91.5, 92, 92.5, 93, 93.5, 94, 94.5, 95, 95.6, 97, 97.5, 98, 98.5, 99, or 99.5% or more, but less than 100%, of a composition, or any range derivable therein. The weight percents are given on dry basis. The weight percents of the phosphate removing substance, the polymer flocculant, and the enzyme can be adjusted to meet the intended application. For example, where the phosphate concentration is high, the phosphate removing substance may comprise a majority of the composition. When a combination of components is specified for a composition, composite, or admix, the weight percent of such specified components may total 100% by weight.

Any composite, admix, or composition of the various embodiments may comprise one or more compounds or components, may consist of one or more compounds or components, or may consist essentially of one or more compounds or components. It is understood that any composite, admix or composition that consists essentially of one or more compounds or components may further include other compounds or components that do not materially affect the basic and novel characteristics of the composite, admix, or composition.

Methods of Making a Composite

Another embodiment is related to a method of making a composite containing a phosphate removing substance, a polymer flocculant, and an enzyme. One method of making a composite containing a phosphate removing substance, a polymer flocculant, and an enzyme comprises the following steps. The specific phosphate removing substance, polymer flocculant, and enzyme mentioned may be substituted with other compounds disclosed herein.

Adding a measured amount of an aqueous zirconium acetate solution (as 22% $ZrO_2$) to a mixing tank, followed by adding a measured amount of chitosan solid flakes to the mixing tank containing the zirconium acetate solution and mixing sufficiently, followed by adding a measured amount of acetic acid (can be diluted glacial acetic acid or neat glacial acetic acid) to the mixing tank containing the zirconium acetate and chitosan and mixing, followed by adding a measured amount of enzyme concentrate either in powder or liquid form, followed by mixing thoroughly and sufficiently to allow the ingredients to fully react, followed by filtering the reaction mix to remove any insoluble material, followed by drying the filtered reaction mix. Any number of ways to dry can be utilized as is known by one skilled in the art of commercial drying. Spray drying is the preferred method although tray drying is also acceptable. Maintaining the drying temperature to no higher than 55° C. is preferred. A higher temperature is allowable as long as the dried composite remains soluble and the flocculation activity is not destroyed. After drying the dry homogeneous free-flowing crystalline composite can be sieved to defined particle sizes if desired and packaged into water soluble films (comprised of partially hydrolyzed polyvinylalcohol or hydrolyzed co-polymers of vinylacetate, for example) in the form of pouches/pods and sealed. Cellulosic-based water soluble pods or pouches can also be used. The sealed pouches/pods can be packaged into Mylar or moisture barrier packaging containing a dessicant. Molecular sieve dessicants such as Siliporite is preferred. Alternatively, the dry composite can be packaged into a non-water soluble package for dispensing directly into a body of water by simple pouring the dry composite granules or powder from the non-water soluble package into the body of water to be treated.

An alternative method of making a composite containing a phosphate removing substance, a polymer flocculant and an enzyme comprises the following steps.

Adding a measured amount of an aqueous zirconium acetate solution (as 22% $ZrO_2$) to a mixing tank, followed by adding a measured amount of enzyme concentrate either in powder or liquid form and mixing sufficiently, followed by adding a measured amount of chitosan solid flakes to the mixing tank containing the zirconium acetate solution and mixing sufficiently, followed by adding a measured amount of acetic acid (can be diluted glacial acetic acid or neat glacial acetic acid) to the mixing tank containing the zirconium acetate, enzyme and chitosan and mixing sufficiently, followed by mixing thoroughly and sufficiently to allow the ingredients to fully react, followed by filtering the reaction mix to remove any insoluble material, followed by drying the filtered reaction mix. Any number of ways to dry can be utilized as is known by one skilled in the art of commercial drying. Spray drying is the preferred method although tray drying is also acceptable. Maintaining the drying temperature to no higher than 55° C. is preferred. A higher temperature is allowable as long as the dried composite remains soluble and the flocculation activity is not destroyed. The dry homogeneous free-flowing crystalline composite can be sieved to defined particle sizes if desired and packaged into water soluble films (comprised of partially hydrolyzed polyvinylalcohol or hydrolyzed co-polymers of vinylacetate, for example) in the form of pouches/pods and sealed. Cellulosic-based water soluble pods or pouches can also be used.

The sealed pouches/pods can be packaged into Mylar or moisture barrier packaging containing dessicant. Molecular sieve dessicants such as Siliporite is preferred. Alternatively, the dry composite can be packaged into a non-water soluble package for dispensing directly into a body of water by simple pouring the dry composite granules or powder from the non-water soluble package into the body of water to be treated.

Alternative methods of making a composite containing a phosphate removing substance, a polymer flocculant, and an enzyme can be used. A measured amount of enzyme (either in dry form or liquid concentrate form) is added while stirring to a mixing tank containing water. The water containing the enzyme is mixed until the enzyme is sufficiently mixed until dissolved. A measured amount of zirconium acetate solution (as 22% $ZrO_2$) is slowly added, with mixing, to the tank containing the dissolved enzyme.

In a separate tank, the chitosan can be dissolved in an aqueous solution containing dilute acetic acid. A measured amount of chitosan flake is added to a mixing tank containing water and mixed to sufficiently wet the chitosan. This is followed by adding a measured amount of neat glacial acetic acid or diluted glacial acetic acid to the mixing tank and mixing to dissolve the chitosan. A measured amount of the dissolved chitosan is then slowly added to the tank containing the solution of zirconium acetate solution and dissolved enzyme and the entire contents mixed and allowed to react. The solution of reaction mix containing the composite of zirconium acetate, chitosan and enzyme is filtered to remove insolubles and then dried as described earlier. Grinding and/or sieving if desired of the dry composite can be performed followed by packaging as described earlier.

In another method, a measured amount of a dry phosphate removing substance can be slowly added to a measured amount of an aqueous solution containing a dissolved chitosan and dissolved enzyme and allowed to mix to form a composite. The reaction mix containing the composite is then filtered and dried. The dry composite can be ground and sieved if desired and pouched and packaged as described earlier.

It is understood that various composites can be created by only mixing certain of the active ingredients. For example, a phosphate removing polymer flocculant composite can be created by leaving the enzyme out the reaction mixture containing only the phosphate removing substance and the polymer flocculant.

Methods of Making an Admix

Another embodiment is related to making an admix containing a phosphate remover, a polymer flocculant, and an enzyme. An admix containing a phosphate remover, a polymer flocculant, and an enzyme can be made by blending all three ingredients together in dry form and packaging the admix into water soluble films (comprised of partially hydrolyzed polyvinylalcohol or hydrolyzed co-polymers of vinylacetate, for example) in the form of pouches/pods that are sealed. The sealed pouches/pods can be packaged into Mylar or moisture barrier packaging containing a dessicant. Molecular sieve dessicants such as Siliporite is preferred. Alternatively, the dry admix can be packaged into a non-water soluble package for dispensing directly into a body of water by simple pouring of the dry admix powder or granules from the non-water soluble package into the body of water to be treated.

EXAMPLES

Example 1

Crystals of a Composite of a Phosphate Remover, Polymer Flocculant, and an Enzyme A spray dried composite was prepared by mixing a solution of zirconium acetate, chitosan acetate, and the enzyme pepsin. Photographs of the composite crystals are shown in FIGS. 2 and 3

Example 2

Figure 4:
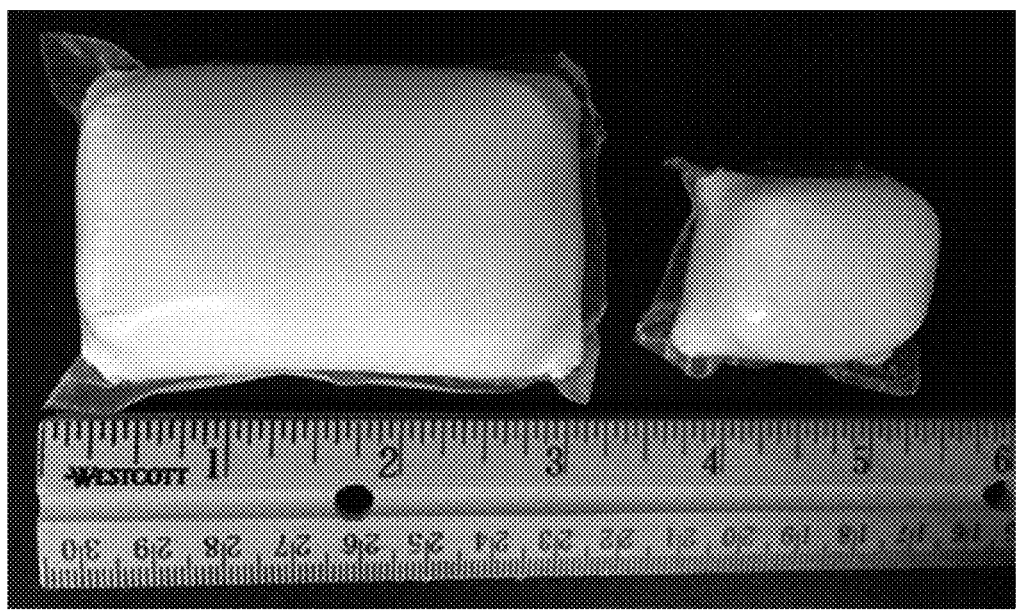
FIG. 4 is a photograph of sealed water soluble pouches containing a composite of a phosphate remover, polymer flocculant, and an enzyme (left), and a chitosan salt polymer flocculant (right)

Water Soluble Pouch Containing a Composite of a Phosphate Remover, Polymer Flocculant, and an Enzyme Crystals of a composite comprised of a phosphate remover, polymer flocculant, and an enzyme were packaged in a sealed water soluble pouch as shown in FIG. 4. It should be understood that pouches can be made to contain any of the compounds disclosed herein.

Example 3

Figure 5A:
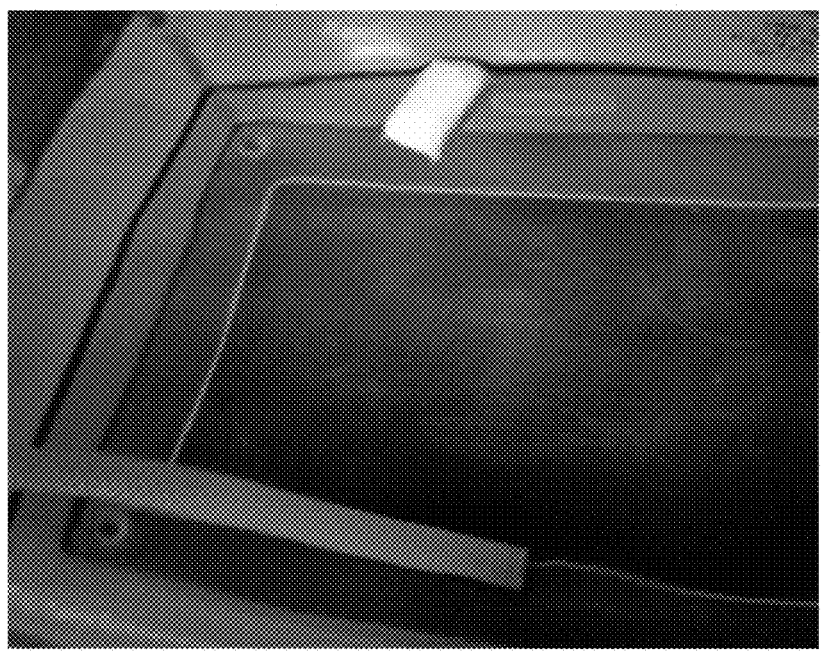
FIGS. 5A, 5B, 5C, 5D, 5E, and 5F are photographs taken at various stages to demonstrate the dissolution of a water soluble pouch.
Figure 5B:
Figure 5C:
Figure 5D:
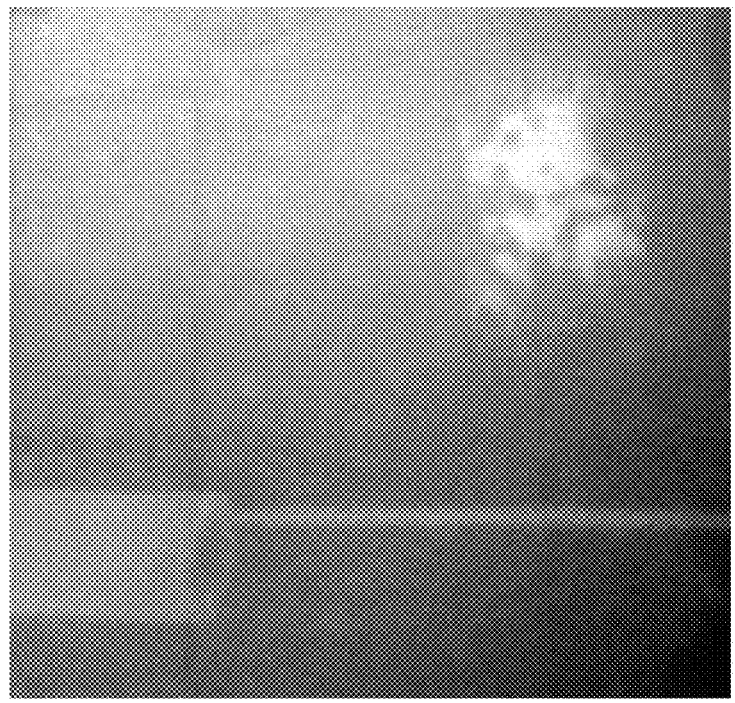
Figure 5E:
Figure 5F:
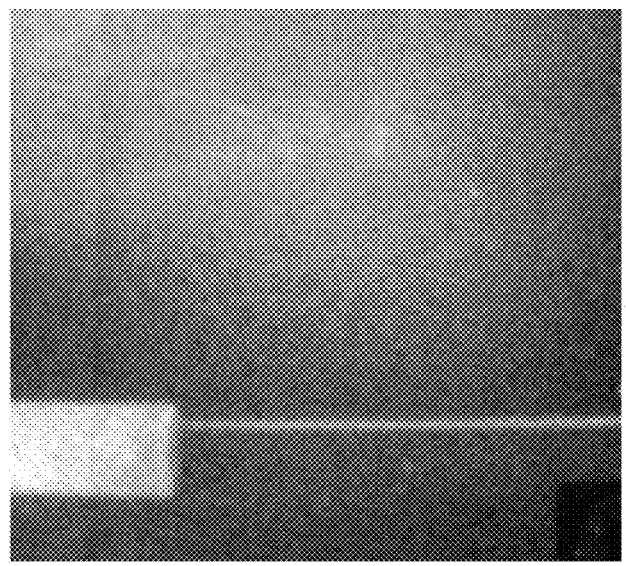

Solubilization of a Sealed Water Soluble Pouch Containing a Phosphate Remover, Polymer Flocculant, and an Enzyme A sealed water soluble pouch containing a measured amount of a composite comprising a phosphate remover, polymer flocculant and an enzyme was added to water and photographed at different time points as it dissolved as shown in FIGS. 5A, 5B, 5C, 5D, 5E, and 5F. FIG. 5A shows the dry pouch. FIG. 5B shows the pouch being added to water. FIG. 5C shows the pouch starting to dissolve. FIG. 5D shows the solubilization of the pouch progressing. FIG. 5E shows the solubilization of the pouch progressing. FIG. 5F shows that the pouch has been fully dissolved.

Example 4

Functioning Performance Properties of a Phosphate Remover, Polymer Flocculant, and Enzyme Composite Phosphate Removal of Composite A measured amount of dried composite prepared by mixing a solution of zirconium acetate, chitosan acetate, and the enzyme pepsin was dried and tested for phosphate removing activity using a standard procedure equivalent to USEPA and Standard Method 4500-P-E for wastewater. The dried composite was added to a measured amount of water to allow the composite to dissolve. A measured amount of the water containing the dissolved composite was added to laboratory prepared swimming pool water containing a measured amount of orthophosphate. After mixing for a determined amount of time, the water was filtered through a Whatman Autovial 0.45 µm glass microfiber filter. The amount of phosphate remaining in the filtered water was determined using a HACH 2800 spectrophotometer, Program #490, following USEPA PhosVer 3 (Ascorbic Acid) method HACH 8048. Phosphate removed by the dissolved composite is reported in Table 1 as the mean of triplicates.

TABLE 1

| Phosphate Removed by Dissolved Composite | | |
|---|---|---|
| Sample | Initial phosphate concentration (ppb) | Phosphate removed (ppb) |
| Dissolved composite | 7920 | 3066 |

Flocculation Performance of Composite

Figure 6:
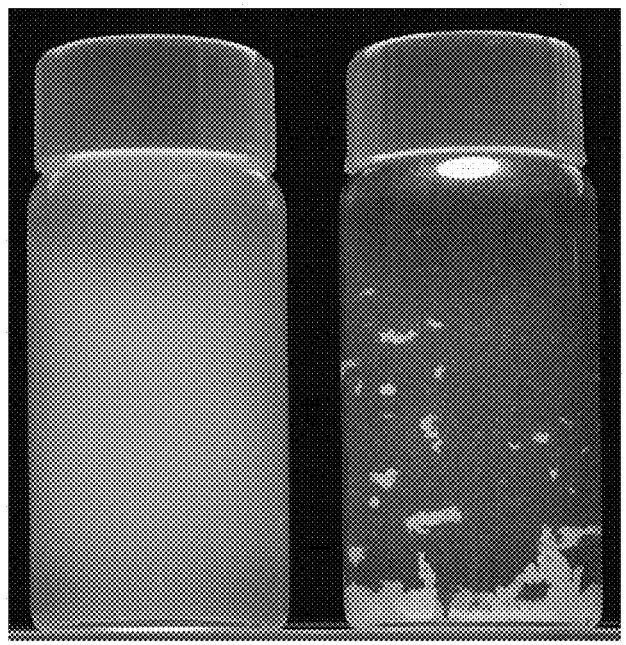
FIG. 6 is a photograph of a dissolved composite flocculating sunblock/sunscreen suspended insolubles present in swimming pool water compared to a control sample.

A measured amount of dried composite prepared by mixing a solution of zirconium acetate, chitosan acetate, and the enzyme pepsin was dried and tested for flocculation activity using laboratory prepared swimming pool water containing a suspension of sunblock. The dried composite was added to a measured amount of tap water to allow the composite to dissolve. A measured amount of the water containing the dissolved composite was added to laboratory prepared swimming pool water containing a measured amount of sunblock/sunscreen used to create a turbid suspension. As shown in FIG. 6, following mixing, the composite-treated suspension of sunblock/sunscreen (bottle on the right in FIG. 6) was clearly observed to form floccules compared to the non-treated control suspension (bottle on the left in FIG. 6).

Enzyme Activity of Dissolved Composite

A measured amount of dried composite prepared by mixing a solution of zirconium acetate, chitosan acetate, and the enzyme pepsin was dried and tested for pepsin enzyme activity using a standard protocol, which measures the digestion or degradation of the protein hemoglobin. The dry composite was added to a measured amount of water to allow the composite to dissolve. A measured amount of the water containing the dissolved composite was added to a premeasured amount of hemoglobin in an aqueous buffered solution according to the Sigma Chemical Procedure SSH-EMO 01 titled Enzymatic Assay of Pepsin (EC3.4.23.1) Revised Mar. 25, 1996 and incubated at 37° C. for approximately ten minutes. The digestion of hemoglobin was measured by light absorption using a spectrophotometer and the enzyme activity determined and reported in units per ml.

Unit Definition

Figure 7:
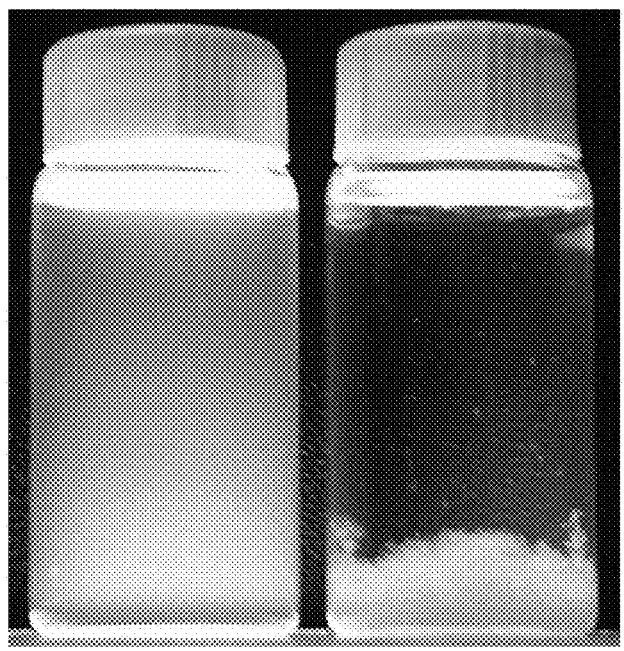
FIG. 7 is a photograph of flocculation of a bentonite clay suspension by a dissolved polymer flocculant.

One unit will produce a $\Delta A280$ nm (wherein the delta signifies a change in absorbance of ultraviolet light of a wavelength of 280 nanometers) of 0.001 per minute at pH 2.0 at 37° C. measured as TCA-soluble products using hemoglobin as substrate. (Final volume=16 ml. Light path=1 cm.). Measured Enzyme activity of the dissolved composite is 8.4 units/mL Flocculation Activity of a Polymer Flocculant Used for Packaging Inside a Sealed Water Soluble Pouch A free-flowing solid granular chitosan lactate flocculant was added to tap water and allowed to dissolve. A measured amount of the tap water containing the dissolved flocculant was added to laboratory prepared swimming pool water containing a suspension of bentonite clay. As shown in FIG. 7, formation of floccules in the chitosan flocculant-treated sample was observed (bottle on the right in FIG. 7). The non-treated control showed no flocculation of suspended bentonite particles (bottle on the left in FIG. 7).

Flocculation Activity of Dissolved Pouch/Pod Containing a Polymer Flocculant

Figure 8A:
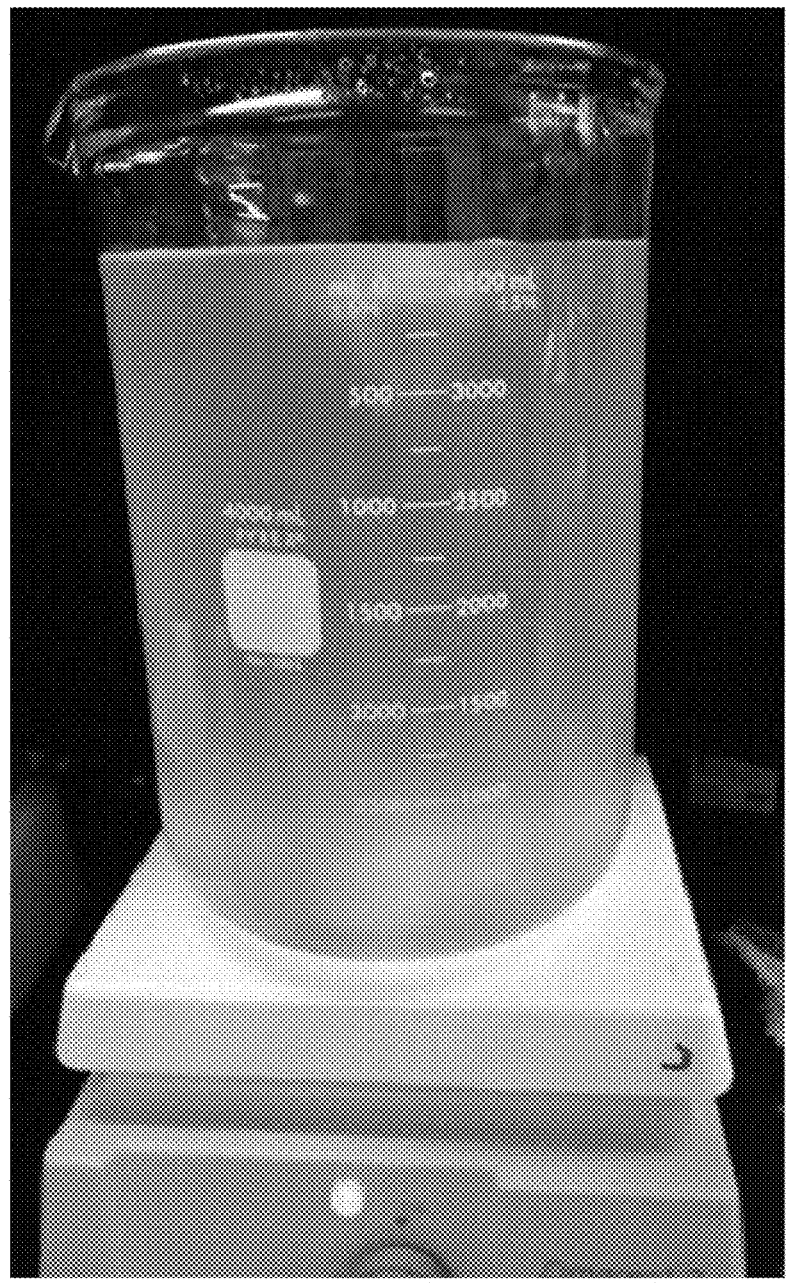
FIGS. 8A, 8B, 8C, and 8D are photographs showing the flocculation activity of a dissolved pouch/pod containing a polymer flocculant.
Figure 8B:
Figure 8C:
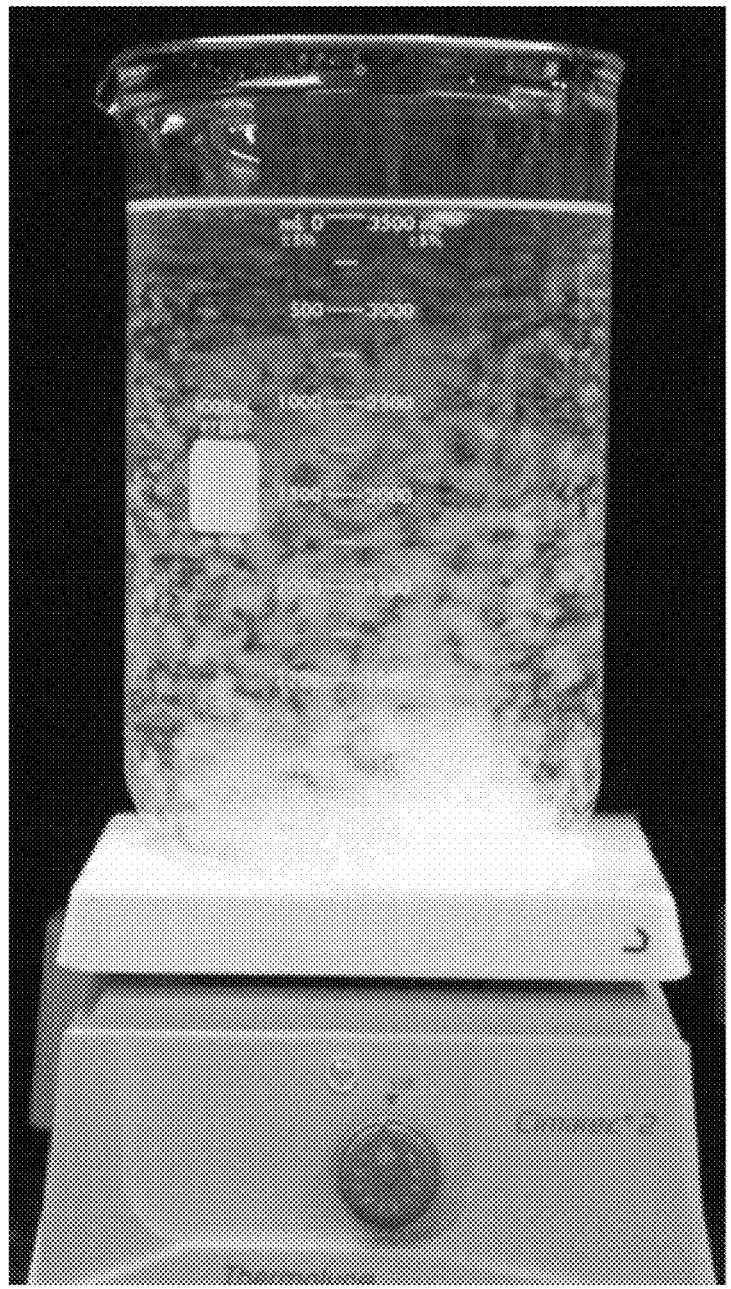
Figure 8D:
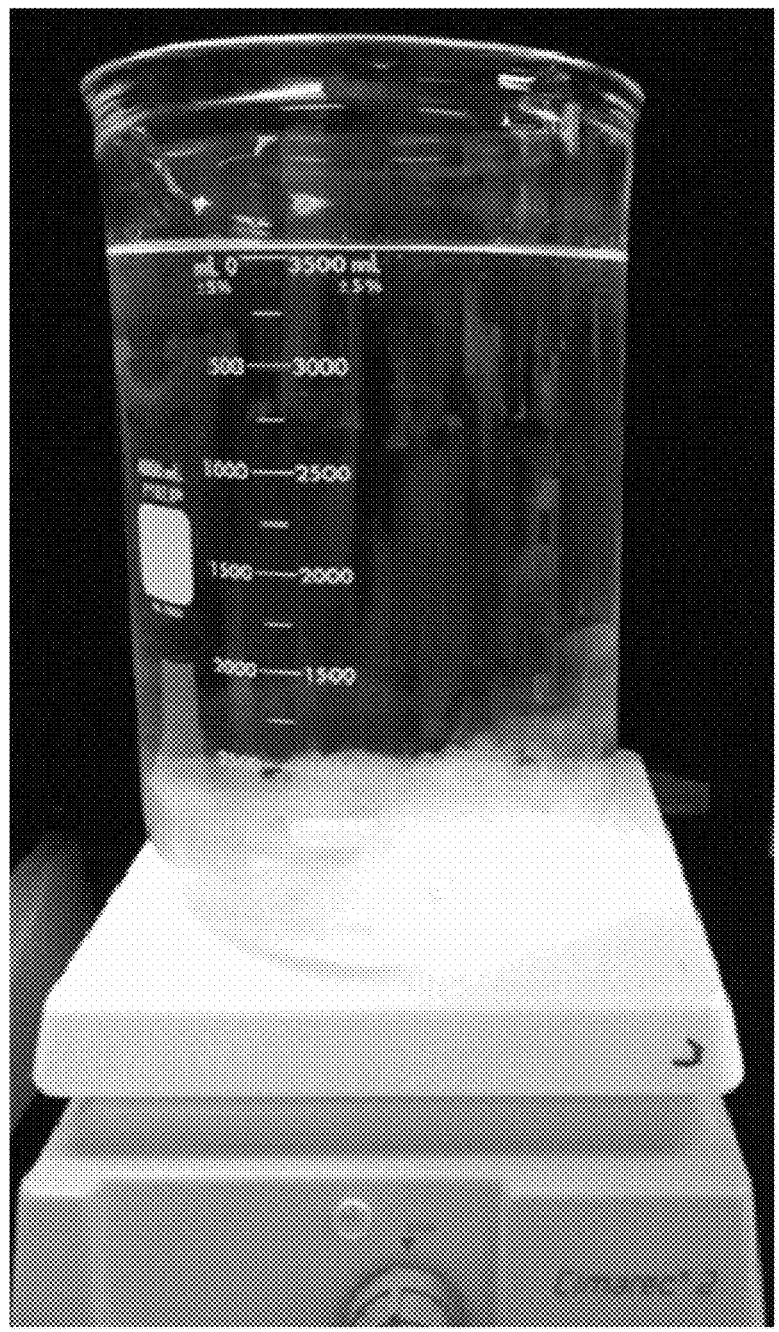

A sealed water soluble pouch/pod containing a measured amount of a free-flowing solid granular chitosan lactate was added to laboratory-prepared chlorinated swimming pool water containing a suspension of bentonite clay and allowed to dissolve. As shown in the FIGS. 8A, 8B, 8C, and 8D, the dissolved pod containing the solid granular chitosan lactate flocculated the fine suspension. FIG. 8A shows a sample of pool water containing a suspension of bentonite clay. FIG. 8B shows chitosan lactate contained in a water soluble pouch added to the bentonite clay suspension. FIG. 8C shows formation of floccules. FIG. 8D shows clarified water containing settled flocculate solids.

Phosphate Removal of Composite

A sealed water soluble pouch containing a measured amount of dried composite prepared by mixing a solution of zirconium acetate, chitosan acetate and the enzyme pepsin was tested for phosphate removing activity using a standard procedure equivalent to USEPA and Standard Method 4500-P-E for wastewater. A measured amount of orthophosphate was added to tap water. The initial orthophosphate concentration was measured by filtering a sample of the tap water containing orthophosphate through a Whatman Autovial 0.45 µm glass microfiber filter, and the amount of orthophosphate in the filtered water was determined using a HACH 2800 spectrophotometer, program #490, following USEPA PhosVer 3 (Ascorbic acid) method (HACH 8048). The water soluble pod containing the dried composite was added to the tap water containing orthophosphate and allowed to dissolve. After mixing for a determined amount of time, the concentration of orthophosphate in the tap water containing orthophosphate and the dissolved pouch containing the composite was determined following the same method as was used to determine the initial orthophosphate concentration. Phosphate removed by the dissolved composite is reported in Table 2 as the mean of triplicates.

TABLE 2

Phosphate Removed by Dissolved Composite

| Sample | Initial orthophosphate concentration (ppb) | Phosphate removed (ppb) |
|---|---|---|
| Dissolved composite | 9330 | 780 |

Flocculation Activity of Dissolved Pouch/Pod Composite

Figure 9A:
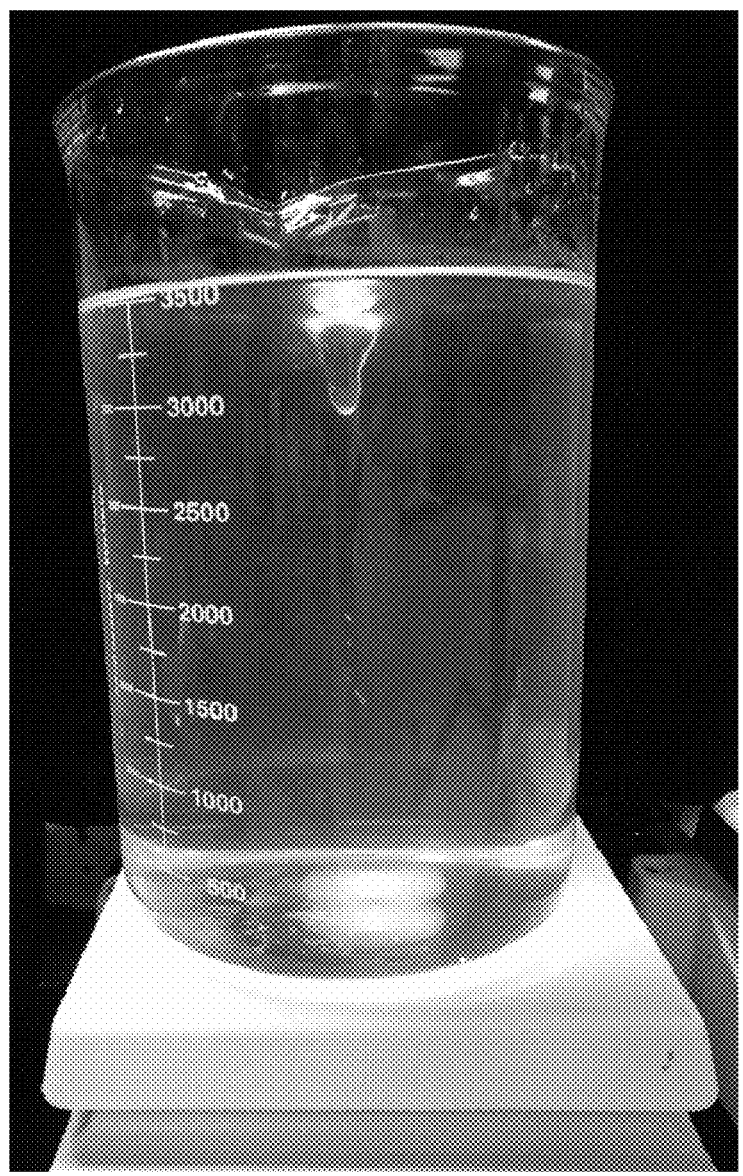
FIGS. 9A, 9B, and 9C are photographs showing flocculation activity of a dissolved pouch/pod containing a phosphate removing substance, a polymer flocculant, and an enzyme.
Figure 9B:
Figure 9C:
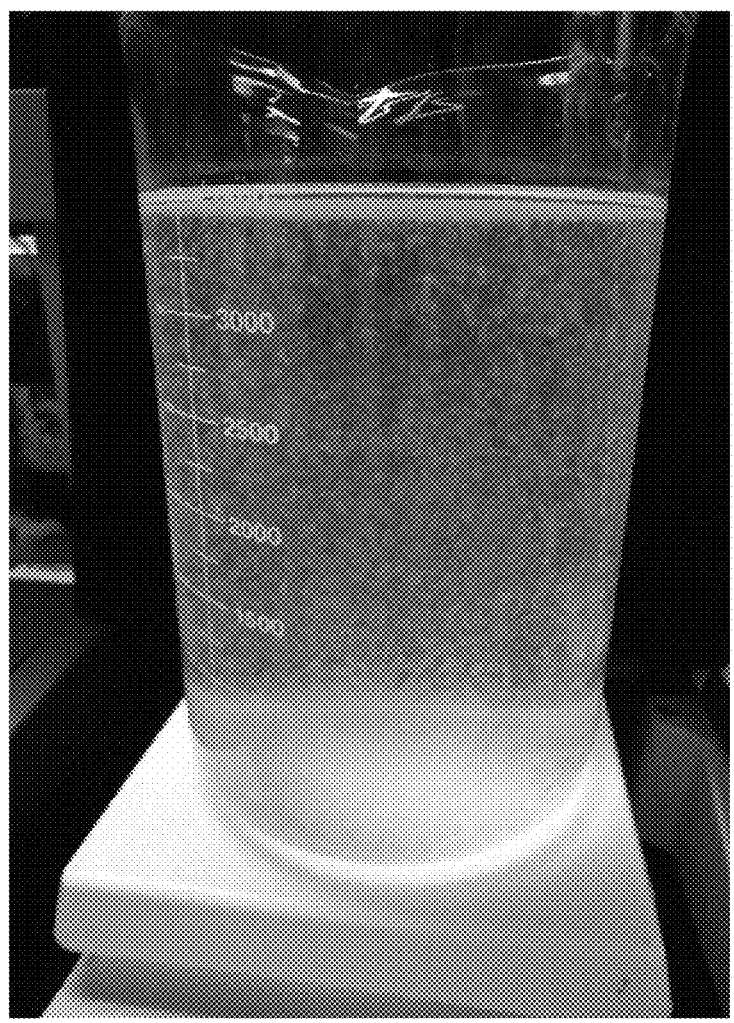

As shown below, a sealed water soluble pouch/pod containing a measured amount of a dried composite prepared by mixing a solution of zirconium acetate, chitosan acetate and the enzyme pepsin was tested for flocculation activity. The pod was added to laboratory prepared swimming pool water containing a suspension of lotion and allowed to dissolve. As shown in FIGS. 9A, 9B, and 9C following mixing, the composite-treated suspension of moisturizing skin conditioner lotion was observed to form floccules. FIG. 9A shows a turbid suspension of laboratory prepared swimming pool water containing a suspension of lotion. FIG. 9B shows a water soluble pod containing the dried composite added to the lotion suspension. FIG. 9C shows formation of floccules.

While illustrative embodiments have been illustrated and described, it will be appreciated that various changes can be made therein without departing from the spirit and scope of the invention.

The embodiments of the invention in which an exclusive property or privilege is claimed are defined as follows:

1. A water treatment composition, comprising: dry composite particles, each dry composite particle comprising a phosphate removing substance and a polymer flocculant, wherein the dry composite particles are free-flowing, granular solid, chemically homogeneous particles and the phosphate removing substance and polymer flocculant are bound to each other within the dry composite particles.

2. The water treatment composition of claim 1, wherein the dry composite particles have a crystal structure.

3. The water treatment composition of claim 1, wherein the dry composite particles further comprise an enzyme, and wherein the enzyme is bound to at least one of the phosphate removing substance and polymer flocculant within the dry composite particles.

4. The water treatment composition of claim 1, wherein the dry composite particles are water soluble.

5. The water treatment composition of claim 1, wherein the dry composite particles are contained in a sealed water soluble pouch.

6. The water treatment composition of claim 5, wherein the sealed water soluble pouch is hydrolyzed polyvinyl alcohol or a cellulose-based material.

7. The water treatment composition of claim 1, wherein the phosphate removing substance is chosen from a zirconium compound, a rare earth lanthanide salt, an aluminum compound, an iron compound, or any combination thereof.

8. The water treatment composition of claim 1, wherein the phosphate removing substance is chosen from zirconium acetate, zirconium sulfate, zirconium oxychloride, zirconium basic sulfate, and various combinations thereof.

9. The water treatment composition of claim 1, wherein the phosphate removing substance is lanthanum chloride or lanthanum sulfate.

10. The water treatment composition of claim 1, wherein the phosphate removing substance is chosen from aluminum sulfate, aluminum chloride, polyaluminum chloride, aluminum chlorohydrate, polyaluminum hydroxide sulfate, polyaluminum sulfate chloride, polyaluminum silicate chloride, and various combinations thereof.

11. The water treatment composition of claim 1, wherein the phosphate removing substance is chosen from iron oxide, iron oxide hydroxide, zerovalent iron, ferric hydroxide, ferric sulfate, ferric chloride, ferric chloride sulfate, polyferric sulfate, ferrous sulfate, and various combinations thereof.

12. The water treatment composition of claim 1, wherein the polymer flocculant is chosen from a synthetic polymer, a natural biopolymer polysaccharide, a derivatized natural biopolymer saccharide, or any combination thereof.

13. The water treatment composition of claim 1, wherein the polymer flocculant is chosen from a polyacrylamide, a polyacrylamide copolymer, acrylamide copolymers of diallydimethylammonium chloride (DADMAC), dimethylaminoethylacrylate (DMAEA), dimethylaminoethylmethacrylate (DMAEM), 3-methylamidepropyltrimethylammonium chloride (MAPTAC) or acrylic acid; a cationic polyacrylamide; an anionic polyacrylamide; a neutral polyacrylamide; a polyamine; polyvinylamine; polyethylene imine; polydimethyldiallylammonium chloride; poly oxyethylene; polyvinyl alcohol; polyvinyl pyrrolidone; polyacrylic acid; polyphosphoric acid; polystyrene sulfonic acid; and various combinations thereof.

14. The water treatment composition of claim 1, wherein the polymer flocculant is chosen from chitosan acetate, chitosan lactate, chitosan adipate, chitosan glutamate, chitosan succinate, chitosan malate, chitosan citrate, chitosan fumarate, chitosan hydrochloride, and various combinations thereof.

15. The water treatment composition of claim 1, wherein the polymer flocculant is chosen from guar, cationic guar, anionic guar, starch, cationic starch, anionic starch, carrageenan, methylcellulose, hydroxypropylcellulose, sodium carboxymethylcellulose, hydroxymethylcellulose, hydroxypropylmethylcellulose, hydroxyethylcellulose, xanthan, alginates, pectins, glucomannans, galactomannans, and various combinations thereof.

16. The water treatment composition of claim 3, wherein the enzyme is chosen from an amylase, a cellulase, a protease, a lipase, a phosphatase, a peroxidase, a pectinase, a pepsin, or any combination thereof.

17. The water treatment composition of claim 1, wherein the phosphate removing substance is zirconium acetate and the polymer flocculant is a chitosan salt, and the dry composite particles further comprise a pepsin enzyme, wherein the phosphate removing substance, the polymer flocculant, and the pepsin enzyme are bound to each other.

18. The water treatment composition of claim 1, wherein the phosphate removing substance is lanthanum chloride and the polymer flocculant is a chitosan salt, and the dry composite particles further comprise a pepsin enzyme, wherein the phosphate removing substance, the polymer flocculant, and the pepsin enzyme are bound to each other.

19. The water treatment composition of claim 1, wherein the composite particles further comprise an algicide.

20. A method of treating an aqueous body of water, comprising adding to the aqueous body of water the water treatment composition of claim 1.

21. A water treatment composition comprising: composite particles, each composite particle comprising a phosphate removing substance and a chitosan polymer, wherein the composite particles are free-flowing, granular solid, chemically homogeneous particles, and the phosphate removing substance and chitosan polymer are bound to each other within the composite particles.

22. A water treatment composition comprising: composite particles contained in a water-soluble pouch, each composite particle comprising a phosphate removing substance and a polymer flocculant, wherein the composite particles are free-flowing, granular solid, chemically homogeneous particles, and the phosphate removing substance and polymer flocculant are bound to each, other within the composite particles.

* * * * *